May 23, 1950 R. S. MAUTNER 2,508,923

SYNCHRONIZING SYSTEM

Filed June 27, 1946 2 Sheets-Sheet 1

INVENTOR

Robert S. Mautner

BY H. S. Grover.

ATTORNEY

INVENTOR
Robert S. Mautner
BY H. S. Grover
ATTORNEY

Patented May 23, 1950

2,508,923

UNITED STATES PATENT OFFICE 2,508,923

SYNCHRONIZING SYSTEM

Robert S. Mautner, New York, N. Y., assignor to Radio Corporation of America, a corporation of Delaware Application June 27, 1946, Serial No. 679,627

7 Claims. (Cl. 178—69.5)

Figure 1:
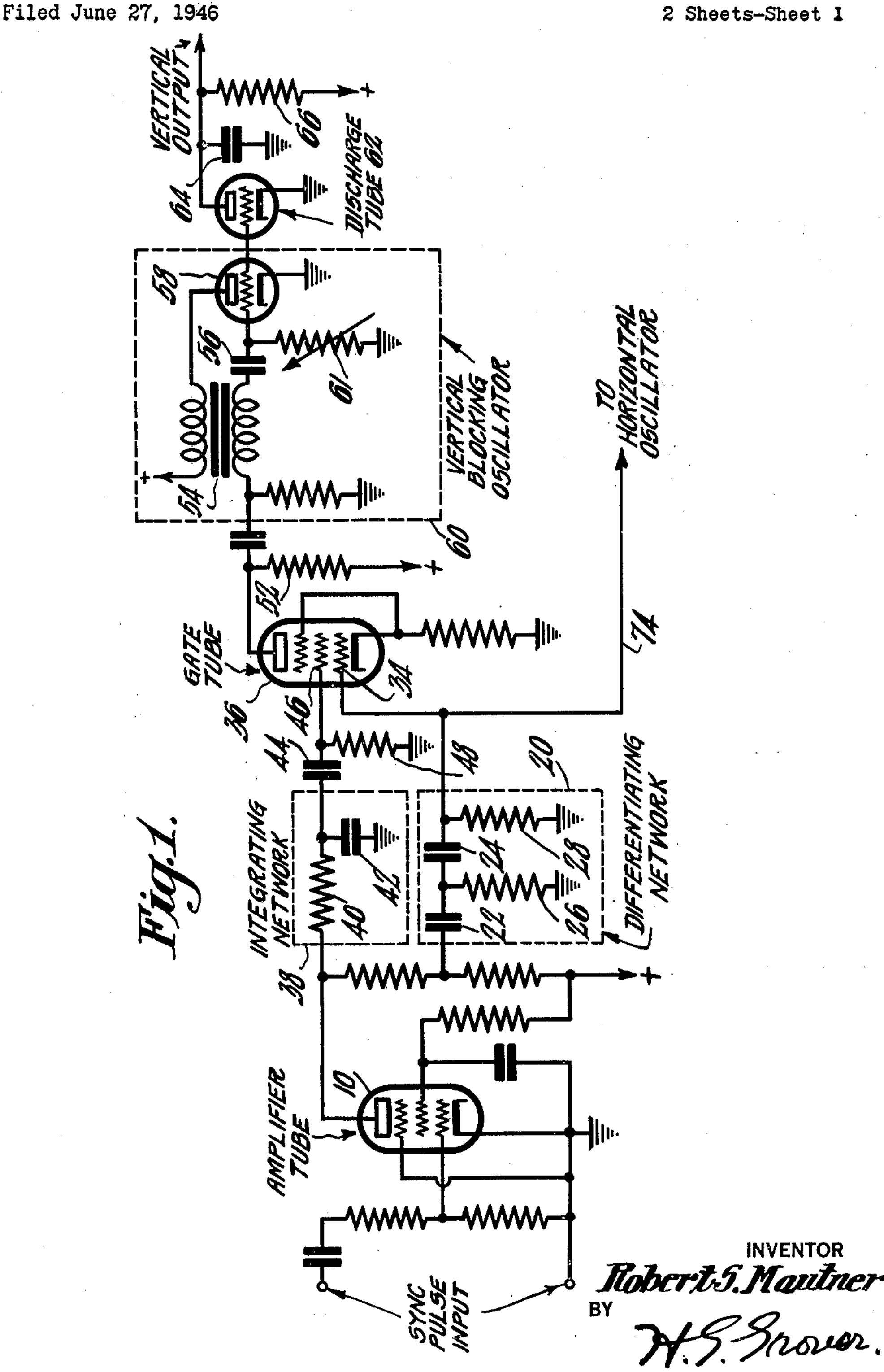

The present invention relates to television systems, and more particularly relates to a method and means for effecting accurate synchronization of the field-scanning apparatus of a television receiver.

In accordance with present television practice, both video and sync (heretofore frequently called "synchronizing") signal components are employed to modulate a carrier wave. The video components, representative of the light and shadow values of the image being transmitted, modulate the carrier wave during the scanning, or trace, intervals of the scanning cathode ray beam which is developed within the camera tube of the now well-known electronic type of television system. The sync components, on the other hand, modulate the carrier wave during the so-called beam retrace or return line periods or, in other words, during the time that the cathode ray scanning beam is being returned from one extreme position following one line or field scanning for the start of another line-scanning, or field-scanning, operation. These sync components of the signal occur during so-called "blanking periods" when the outgoing signal is made representative of black in the image, according to present standards.

The receiving apparatus which becomes responsive to such produced signals customarily incorporates an image-reproducing tube within which a further cathode ray beam is developed and deflected to scan a luminescent target or screen to develop thereon luminous effects. The video components of the composite television signal, by controlling the intensity of the beam, determine, in well-known manner, the instantaneous degree of illumination of each elemental area of the target. The sync components of the received television signal control the deflection of the beam, so that it will scan the image raster area of the luminescent target in line-by-line synchronism with the operation of the scanning beam developed within the camera tube at the transmitter. Since negative transmission has become standardized and since the sync impulses are transmitted at maximum transmitter carrier amplitude and thus representative of "ultra black" (that is, "blacker-than-black"), the synchronizing or sync components of the transmitted signal suppress the beam of the image reproducing tube during the time they appear. In this manner, a reconstruction of the transmitted image is brought about in a generally known manner.

The synchronizing components of the composite television signal, under present standards, consist of substantially rectangular pulses. While the amplitude of all the pulses is equal, they vary in width or time duration, those which are transmitted during vertical retrace or, in other words, at the end of each field-scanning operation, being of greater width than those which are transmitted during horizontal retrace, that is to say, at the end of each line-scanning interval.

It is necessary in arrangements such as the above to separate the horizontal sync pulses, which occur between successive line-scanning periods from the relatively wider (although usually "slotted") vertical sync pulses which are transmitted between successive frames, so that these two types of pulses may be utilized to trigger the horizontal anad vertical deflection generators, respectively. This is customarily accomplished by employing an integrating circuit to derive a control variation from the relatively wider vertical sync pulses, this control variation being applied to effect synchronization of the vertical deflection generator. An associated differentiating circuit acts to produce a further control variation from the relatively narrow horizontal sync pulses, and this latter control variation is employed to bring about synchronization of the horizontal deflection generator. Each of these two separating circuits is relatively unaffected by the reception of pulses other than those to which it is designed to respond.

The vertical deflection generator which is triggered by the integrated vertical sync pulse in many cases incorporates a so-called blocking oscillator, which includes an electron discharge tube the grid of which is transformer-coupled to the anode. The operation of this blocking oscillator is such that the grid of the tube is driven very negative during a portion of each cycle to block the tube. This negative pulse causes a condenser to charge up to hold the grid negative for a selected time. The charge is then caused to leak off slowly through an impedance. The time constant of the condenser and impedance is made approximately equal to the time interval between successive sync pulses so that the tube grid again reaches a potential at which the tube may conduct at approximately the time of arrival of the next sync pulse. As used in many television systems, however, a vertical sync pulse is applied to a control element of the blocking oscillator tube during each cycle to trigger the tube at a time immediately prior to that at which conduction would normally occur with the oscillator free running or uncontrolled from an external source. Consequently, operation of the blocking oscillator is placed under the control of the arriving vertical sync pulses, it being understood that the vertical or field deflection is referred to herein since the invention is concerned primarily with such a circuit.

Unless the vertical blocking oscillator be triggered at exactly the same point in each successive vertical sync signal, distortion of the reproduced image will occur. This distortion may, for example, consist of "pairing," or loss of proper interlacing, and while this defect does not render the image unintelligible, it does decrease its quality and resolution to a marked degree.

The vertical sync pulse, which is customarily applied to a suitable tube electrode element to control the operation of the blocking oscillator tube serves, where applied to the tube grid as a positive polarity pulse, to raise the potential of the grid to a point where the tube will conduct. This pulse normally is derived by integrating the six rectangular vertical sync pulses transmitted between successive fields, and has a gradually sloping leading edge of serrated outline. Since the leading edge of this pulse is that which triggers the blocking oscillator, it will be apparent that the precise point at which the the conduction level of the tube is reached may vary as a result of a number of factors, such as noise, residual cross-talk from the line-scanning generator to the field-scanning generator, changes in the D.-C. voltage applied to the blocking oscillator as a result of line voltage variations, etc., any one of which may cause the slope of the leading edge of the sync pulse to vary sufficiently to cause the oscillator to trigger at either an earlier or later point in the field-synchronizing signal. The fact that the leading edge of this sync pulse is serrated likewise introduces a factor of uncertainty, since the oscillator may trip on the extremity of one voltage rise or at some intermediate point in the next succeeding voltage rise.

According to a feature of the present invention, means are provided for obtaining more accurate synchronization of the vertical, or field-scanning, generator of a television receiver. This is accomplished by utilizing a triggering voltage for the grid of the blocking oscillator tube which has a substantially vertical leading edge, so that the conduction level of the oscillator tube is reached at substantially identical points in each field-scanning signal. Such a triggering voltage may be derived, for example, by differentiating each rectangular pulse contained in the composite synchronizing signal. By then integrating the rectangular vertical sync pulses, a control effect may be obtained which is employed to permit passage of the sharp differentiated pulses to the grid of the blocking oscillator tube substantially only during the period between the scanning of successive fields. In this preferred embodiment of the present invention, therefore, the integrated vertical sync pulse is not itself applied to the blocking oscillator tube grid, but is instead utilized to control the opening of an electronic switch which passes to the grid of the blocking oscillation tube a series of sharp pulses having substantially vertical leading edges. Irrespective of which particular pulse of this series causes the conduction level of the oscillator tube to be reached, such conduction will occur at a substantially identical point in each field-synchronizing signal, and the disadvantages attendant upon improper synchronization of the oscillator will be avoided.

One object of the present invention, therefore, is to provide an improved method and means for effecting accurate synchronization of the field-scanning apparatus of a television receiver.

A further object of the invention is to provide, for triggering the vertical or field frequency deflection generator of a television receiver, a series of control pulses having substantially vertical leading edges, so that the deflection generator is triggered at substantially identical points in successive field-synchronizing signals.

A still further object of the invention is to provide synchronizing means for a television receiver which is relatively unsusceptible to noise and other interference tending to cause inaccuracy of synchronization and hence distortion of the reproduced image.

Figure 2:
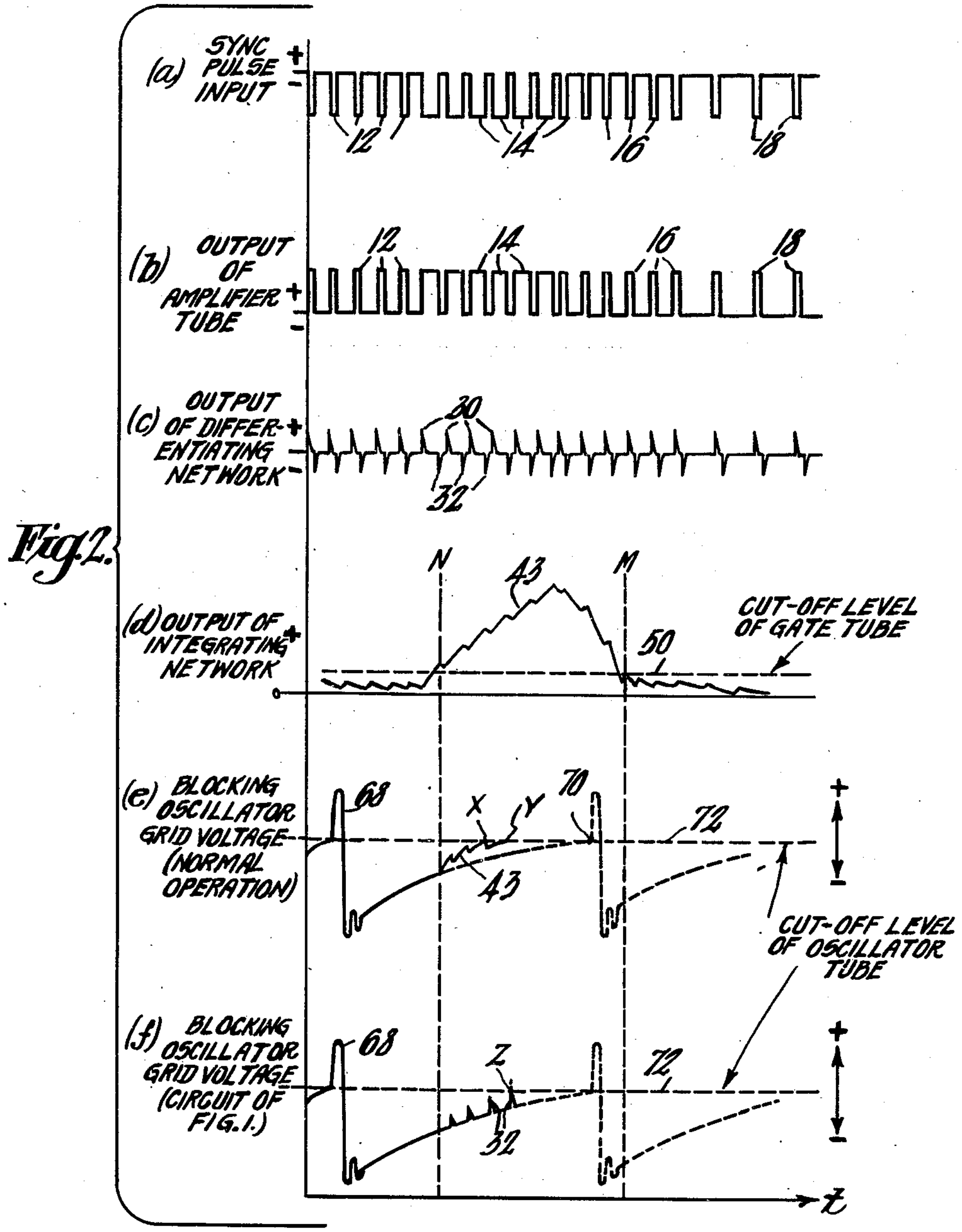

Other objects and advantages will be apparent from the following description of a preferred form of the invention and from the drawing, in which:

Fig. 1 is a circuit diagram of a preferred embodiment of the present invention; and Fig. 2 is a set of waveforms useful in explaining the operation of the circuit of Fig. 1.

In Fig. 1 there is shown a portion of a television receiver including an amplifier tube 10. A composite synchronizing signal which, for example, may have a waveform such as shown by curve *a* of Fig. 2, is applied between the control electrode and cathode of amplifier tube 10. That section of the synchronizing signal waveform shown in curve *a* includes six equalizing pulses 12, six slotted vertical impulses 14 of longer duration, six equalizing pulses 16 having the same duration as the impulses 12, and a number of horizontal synchronizing impulses 18. Similar line or horizontal synchronizing pulses precede the equalizing pulses 12 but are not shown for reasons of simplification of illustration.

The circuit of Fig. 1 forms part of a receiving system designed to receive a transmitted television signal. To simplify the drawing, certain components of the complete receiving system have not been illustrated, but, in the case of a receiver of the superheterodyne type, they may be understood to include, for example, a radio-frequency amplifier (where desired), a first detector or converter, and an oscillator connected to feed also to the converter to heterodyne with the incoming signal to produce the audio and video intermediate frequencies (I. F.) therefrom. The output of the first detector may be applied through an I. F. amplifier to a second detector or demodulator, and thence to a suitable separating circuit for dividing the composite signal into its video and synchronizing components. The video components bring about the production of the received image in any desired and known manner. The synchronizing components synchronize that image production with the transmitter scanning operation. These selected synchronizing components constitute the pulse series shown in curve *a* of Fig. 2 which is applied between the cathode and control electrode of the amplifier tube 10 of Fig. 1.

The pulses of curve *a* extend, as shown, in a negative direction. Amplifier tube 10 is arranged to act as a substantially linear phase inverter amplifier, so tha the pulses of curve *a* are inverted in phase by the action of tube 10 to appear in the output circuit of the tube as a series of pulses of positive polarity. This output wave is indicated by curve *b* of Fig. 2.

A portion of the output of amplifier tube 10 is applied to a differentiating network generally indicated by the reference numeral 20. This differentiating network 20 includes a pair of series capacitors 22, 24 and a pair of shunt resistors 26, 28. The time constant of each of the RC combinations 22, 26 and 24, 28 is preferably quite small, so that the output of the differentiating network 20 will appear as shown in curve c, Fig. 2, that is, a positive peaked pulse 30 will be produced for the leading edge of each rectangular pulse shown in curve b, and a negative peaked pulse 32 will be produced for each trailing edge. The output of the differentiating network 20, consisting of the pulses 30 and 32, is applied to the control eletrode 34 of a gate tube 36 which acts in a manner hereinafter to be described effectively as an electronic switch.

Another portion of the output of amplifier tube 10 is applied to an integrating network 38. This integrating network stage 38 consists of a series resistor 40 and a shunt condenser 42, although, where desired, additional similar stages may be added. The time constant of the RC combination 40, 42 is preferably long, so that the output of network 38 will be substantially as shown in curve d of Fig. 2, that is, a relatively small charge will be built upon condenser 42 during the reception thereby of the equalizing pulses 12 and 16 and the horizontal sync pulses 18. However, during the time that the vertical sync pulses 14 are being received by the integrating network 38, the greater time duration of the pulses 14 will cause the charge on condenser 42 to be appreciably built up in the maner shown in curve d between the time limits indicated by the reference characters N and M. The output of the integrating network 38, indicated in curve d by the reference numeral 43, is applied through a condenser 44 to the screen electrode 46 of gate tube 36. A resistor 48 is connected between the screen electrode 46 of tube 36 and ground.

The gate tube 36 is so arranged as to be normally non-conductive when its screen electrode 46 is substantially at ground potential. However, when the positive potential of the screen electrode 46 reaches a level indicated by the broken line 50 in curve d, then the gate tube 36 is, in effect, opened to act as a substantially class A amplifier. Since during the period of the equalizing and horizontal synchronizing pulses there is no appreciable output from the integrating network 38, the potential of the screen grid 46 remains below the cut-off level 50 of the gate tube 36. However, in response to the reception by network 48 of the vertical synchronizing pulses 14, the output of the integrating network, as shown by the waveform 43, rises above the cut-off level 50 between the time limits indicated by the reference characters N and M. In other words, the gate tube 36 is opened during such period. In this connection, the screen grid condenser 44 and screen grid leak resistor 48 are preferably chosen to have a relatively long time constant.

When the gate tube 36 is opened between the time limits N and M as above brought out, the sharp pulses 30 and 32 constituting the output of the differentiating network 20 are inverted and amplified by the gate tube 36 in substantially linear fashion to appear across the load resistor 52. The pulses 32, which now extend in a positive direction, are applied through one winding of a transformer 54 and a condenser 56 to the grid of a tube 58 forming part of a vertical blocking oscillator unit 60. The anode of tube 58 is connected through the other winding of transformer 54 to a source of positive potential (not shown). A variable resistor 61 connects the tube grid and grid side of condenser 56 to ground. The time constant of the condenser 56 and resistor 61 is set to such a value that it is substantially equal to the time interval between successive field sync pulses. A control of the normal repetition frequency of the oscillator unit 60 may be brought about in a manner well known in the art by varying resistance 61, for instance.

A condenser 64 has one terminal connected to be charged through a resistor 66 from a further source of positive potential (not shown) and the other terminal is grounded so that the condenser charge builds up substantially linearly. A discharge tube 62 has its grid connected directly to the grid of the oscillator tube 58 and its anode is connected to that plate of condenser 64 receiving the positive charge so that during periods of conductivity of the discharge tube 62 the condenser 64 will be discharged through the tube. The discharge tube 62 is normally non-conductive except when a positive pulse is received on its grid. Such a pulse renders the tube conductive and the low impedance path so formed permits condenser 64 to discharge therethrough. The output of condenser 64 is therefore a voltage wave of substantially sawtooth configuration, as is well known in the art.

The operation of the vertical blocking oscillator unit 60 is, under standard conditions, graphically illustrated in Fig. 2 by the curve e. The starting of plate current in tube 58 drives the grid of the tube positive and causes grid current to flow. During the time that grid current is flowing the condenser 56 is rapidly charged by this grid current and the grid of the tube goes negative and the tube is biased to a cut-off state. The charge which is there built up in condenser 56 is then slowly discharged through resistor 61 as shown by the waveform in Fig. 2 (e). When the negative charge of condenser 56 leaks off slowly through resistor 61, a condition is finally reached where plate current can again flow in the tube, as is represented at the point 70 in curve e. This gives rise to a pulse, such as 68, which then instantaneously controls the tube.

In order that the blocking oscillator unit 60 be triggered in synchronism with the operation of the field-scanning generator at the transmitter, the waveform 43, which is derived by integrating the vertical sync pulses 14, is applied in conventional arrangements to the grid of the oscillator tube 58 to raise the grid voltage of the tube to the cut-off level 72. In other words, the integrated vertical pulse 43 (of positive polarity) is superimposed on the negative voltage effective at the grid of the oscillator tube 58 so as to trigger the tube at some point slightly in advance of the point 70 at which conduction would normally occur in the absence of a synchronizing impulse.

As above brought out, however, the portion of waveform 43 extending above the cut-off level 50 has a gradually sloping leading edge of serrated outline, as shown in curve d. The superimposition of this waveform 43 on the negative grid voltage curve of the oscillator tube 58 results in a condition such as shown in curve e. That is, it is possible for the grid voltage of the oscillator tube to rise to the cut-off level 72 at one of a plurality of points in time such, for example, as indicated in curve e by the reference characters X and Y. Furthermore, the addition of noise or other interference may change the slope of this positive rise in waveform 43 sufficiently to change the instant of triggering of tube 58.

In the circuit of Fig. 1, however, the voltage variation which is applied to the grid of the oscillator tube 58 to effect synchronization of the oscillator unit 60 comprises amplified and inverted pulses resulting from passing the sharply differentiated pulses forming the output of the differentiating network through tube 36 so that the pulses 32 become effective as the control pulses with the inversion provided by tube 36. (The pulses 30, which comprise the remainder of curve *c*, extend, when inverted by tube 36, in a negative direction to add to the negative grid voltage of the oscillator tube 58, and can, therefore, be disregarded for the purposes of the present invention.)

The effect of superimposing the peaked pulses 32 upon the bias voltage of the oscillator tube 58 is shown in curve *f* of Fig. 2. Due to the substantially vertical leading edges of the pulses 32, it will be apparent that, irrespective of which particular pulse in the output of the differentiating network 20 causes the grid voltage of tube 58 to reach the cut-off level 72, this instant at which cut-off is reached will not deviate in time from one field-synchronizing interval to another. In other words, the point Z, denoting the triggering point of the oscillator unit 60, occurs at the same moment in each successive field-scanning signal.

Since the output of the differentiating network 20 comprises the peaked pulses shown in curve *c*, a portion of this output may be applied through a lead 74 directly to the line-scanning oscillator (not shown) for purposes of horizontal or line synchronization. In such an event, however, it may be necessary to provide some means for preventing "kick-back" from the line-scanning oscillator from being applied over lead 74 to cause incorrect triggering of the vertical blocking oscillator 60. One such means might comprise an AFC (automatic frequency control) circuit connected to the lead 74. Alternatively, the composite synchronizing wave (*a*, Fig. 2) may be taken from the control grid of the amplifier tube 10 with negative polarity, differentiated by a network distinct from the network 20, and applied to the grid 34 of tube 36. The network 20 would then be disconnected from grid 34, and its entire output applied to the horizontal oscillator over lead 74. Since the latter would not be connected to the grid 34, no "kick-back" could occur.

Having thus described my invention, I claim:

1. In a television system in which a composite television signal is received and utilized to effect the reproduction of an image, said composite television signal including both video and synchronizing components, the latter consisting of pulses having equal amplitude and of rectangular waveform, certain of said pulses being of relatively short time duration, others of said pulses being of relatively longer duration but serrated at a harmonic of the repetition frequency of said short pulse and recurring at field-scanning frequency, the method of applying said synchronizing components to effect synchronization of the receiver field-scanning generator which comprises differentiating the said synchronizing components to obtain a series of peaked pulses having substantially vertical leading edges representative of the edges of said serrations and said short and longer duration synchronizing pulses, simultaneously integrating the said synchronizing components to obtain a control variation which exceeds a predetermined amplitude substantially only during the time periods of the said relatively longer pulses, applying the said differentiated synchronizing components to synchronize the said receiver field-scanning generator, and applying the said integrated synchronizing components to control the time intervals during which the said differentiated synchronizing components are so applied said time intervals being restricted to the first portion of each long duration pulse period.

2. In a television system in which a composite television signal is received and utilized to effect the reproduction of an image, said composite television signal including both video and synchronizing components, the latter consisting of pulses having substantially equal amplitude and of rectangular waveform, certain of said pulses being of relatively short time duration, others of said pulses being of relatively longer duration but serrated at a harmonic of said short pulses repetition frequency and recurring at field-scanning frequency, the method of applying said synchronizing components to effect synchronization of the receiver field-scanning generator which comprises deriving from the said synchronizing components a series of sharp pulses the leading edges of which are substantially vertical and correspond in time respectively to the leading edges of the rectangular pulses and serrations, simultaneously deriving from the said synchronizing components a control voltage which exceeds a predetermined value substantially only during the time periods of the said relatively longer pulses, applying the said control voltage to render the said receiver field-scanning generator receptive to the said sharp pulses, and applying the said sharp pulses to said generator during its receptive periods.

3. The method of synchronizing a field deflection generator forming part of a receiver designed to receive a composite signal including both high-frequency modulations and synchronizing components, the latter including both line and field synchronizing pulses said field synchronizing pulses being serrated at a harmonic of said line synchronizing pulses repetition frequency, said method comprising deriving a first control variation indicative of the said line pulses and said field pulse serrations, simultaneously deriving a second control variation indicative of the said field pulses, and applying said first variation to said deflection generator under the control of said second variation only during intervals corresponding to the first portion of each field synchronizing pulse period.

4. In a television receiver designed to receive and demodulate a composite television signal including both video and synchronizing components, the latter embracing both line and field sync pulses, said field sync pulses being in turn serrated at a harmonic of said line synchronizing pulses, the combination of, means for deriving from the demodulated signal a first control voltage waveform having variations corresponding to substantially only said line sync pulses and the serrations of said field sync pulses, means for deriving from the demodulated signal a second control voltage waveform having variations corresponding to substantially only said field sync pulses, an electronic switch, means for applying said second control voltage waveform to close said switch only for portions of said control waveform exceeding a predetermined amplitude level during the first portion of each field sync pulse, means for applying said first control voltage waveform to the input of said switch, a field deflection generator for said receiver, and means for applying the output of said switch to said deflection generator so as to synchronize said generator with said first control voltage waveform only when said switch is closed by said second control voltage waveform.

5. In a receiver designed to respond to a synchronizing signal having both line and field sync pulse components said field pulses being serrated at a harmonic of the line sync pulse repetition frequency, a first filter network designed to produce an output variation indicative of the edges of line sync pulse information as well as said field pulse serrations in said synchronizing signal, a second filter network designed to produce an output variation indicative of the field sync information in said signal, an electron discharge tube having at least an anode, a cathode, and two control electrodes, means connecting one control electrode of said tube to the output of said first filter network, means connecting a further control electrode of said tube to the output of said second filter network, a field deflection generator, and means for applying the output of said tube to control the operation of said generator.

6. A television receiver according to claim 5, in which said electron discharge tube is normally non-conductive when the output variation produced by said second filter network is below a predetermined amplitude.

7. A television receiver according to claim 5, in which said field deflection generator includes a blocking oscillator, the output of said electron discharge tube being applied to trigger said oscillator.

ROBERT S. MAUTNER.

REFERENCES CITED

The following references are of record in the file of this patent:

UNITED STATES PATENTS

| Number | Name | Date |
|---|---|---|
| 2,141,343 | Campbell | Dec. 27, 1938 |
| 2,207,775 | Bedford | July 16, 1940 |
| 2,258,943 | Bedford | Oct. 14, 1941 |
| 2,277,000 | Bingley | Mar. 17, 1942 |
| 2,292,148 | Moe | Aug. 4, 1942 |
| 2,359,447 | Seeley | Oct. 3, 1944 |
| 2,425,491 | Schlesinger | Aug. 12, 1947 |

FOREIGN PATENTS

| Number | Country | Date |
|---|---|---|
| 487,560 | Great Britain | Jan. 22, 1938 |
| 517,181 | Great Britain | Jan. 23, 1940 |